US010869111B2

(12) United States Patent
Chazot et al.

(10) Patent No.: US 10,869,111 B2
(45) Date of Patent: Dec. 15, 2020

(54) WIRELESS COMMUNICATION PROTOCOL WITH PERIPHERAL DEVICES

(71) Applicant: Logitech Europe S.A., Lausanne (CH)

(72) Inventors: Philippe Chazot, Saint-Jorioz (FR); Jiri Holzbecher, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/369,992

(22) Filed: Mar. 29, 2019

(65) Prior Publication Data
US 2020/0137470 A1 Apr. 30, 2020

Related U.S. Application Data

(60) Provisional application No. 62/751,705, filed on Oct. 28, 2018.

(51) Int. Cl.
| | |
|---|---|
| *H04Q 11/04* | (2006.01) |
| *H04L 1/00* | (2006.01) |
| *G06F 13/10* | (2006.01) |
| *H04B 1/38* | (2015.01) |
| *H04L 12/26* | (2006.01) |

(52) U.S. Cl.
CPC ....... *H04Q 11/0457* (2013.01); *G06F 13/102* (2013.01); *H04B 1/38* (2013.01); *H04L 1/0041* (2013.01); *H04L 1/0072* (2013.01); *H04L 43/16* (2013.01); *H04Q 11/0471* (2013.01)

(58) Field of Classification Search
CPC ............ H04Q 11/0457; H04Q 11/0471; G06F 13/102; H04B 1/38; H04L 43/16; H04L 1/0041; H04L 1/0072
See application file for complete search history.

(56) References Cited

U.S. PATENT DOCUMENTS

| | | | |
|---|---|---|---|
| 8,571,005 B1 | 10/2013 | Vleugels et al. | |
| 2004/0059807 A1 | 3/2004 | Klotz et al. | |
| 2006/0215601 A1 | 9/2006 | Vleugels et al. | |
| 2014/0075069 A1* | 3/2014 | Mullins | G06F 13/4269 710/106 |

(Continued)

OTHER PUBLICATIONS

Non-Final Office Action for U.S. Appl. No. 16/420,003 dated Nov. 29, 2019, 12 pages.

*Primary Examiner* — Dady Chery
(74) *Attorney, Agent, or Firm* — Kilpatrick Townsend & Stockton LLP

(57) ABSTRACT

In some embodiments, a transceiver is configured to wirelessly transfer data between a host computing device and a plurality of peripheral devices over a communication path using a communication data construct sent by the transceiver comprising a plurality of packet structures forming a communication protocol for communicating peripheral device data (HID or audio data) between the host device and the plurality of peripheral devices. Each of the packet structures of the plurality of packet structures can include a single destination address configured to identify which of the plurality of peripheral devices will receive peripheral device data from the host computing device in the present packet structure and which of the plurality of computer peripheral devices will not receive peripheral device data from the host computing device in a present packet structure; and a data field configured to contain peripheral operational data for each of the plurality of peripheral devices.

20 Claims, 14 Drawing Sheets

(56) References Cited

U.S. PATENT DOCUMENTS

2016/0127516 A1* 5/2016 Chazot ................... H04L 69/18
                                                    710/11
2016/0142868 A1   5/2016 Kulkarni et al.

* cited by examiner

Time Over-The-Air for an HID Device

Parameters:
HID upstream : 20 bytes
HID downstream : 20 bytes
Turnaround time = 40 µs

Protocol Format:

|  | BLE | Proprietary Communication Protocol (Round Robin) |
|---|---|---|
| SOF | 2 | 1 |
| Address | 4 | 4 |
| Header | 2 (Header)<br>2 (Length)<br>2 (CID)<br>1 (Opcode)<br>2 (Handle) | 1 (Length/Fc Field) |
| MIC (Message integrity check) | 4 | 4 |
| CRC | 3 | 2 |
| Data length (Tx/Rx) | 20/20 | 20/20 |
| Total (bytes) | 42 | 32 |
| Duration @ 2 MBit | 168 µs | 128 µs |
| Total bandwidth (1TX/1RX) | (168+40) *2 = 416 µs | (128+40) x 2 = 336 µs |
| Total bandwidth (2TX/2RX) | (168+40) *2 = 416 µs *2 = 832 µs | (128+40) x 2 = 336 µs *2 = 672 µs |

*FIG. 2*

Time Over-The-Air for One Audio Device

Parameters:
Audio stream : 48 kHz stereo, 24 bits, compression 3.33 bit/sample -> 86 bytes
Microphone : 24 kHz mono, 24 bits, compression rate 3.33 bit/sample -> 22 bytes
Turnaround time = 40 µs

Protocol Format:

|  | BLE | Proprietary Communication Protocol (Round Robin) |
|---|---|---|
| SOF | 2 | 1 |
| Address | 4 | 4 |
| Header | 2 (Header)<br>2 (Length)<br>2 (CID)<br>1 (Opcode)<br>2 (Handle) | 1 (Length/Fc Field) |
| MIC (Message integrity check) | 4 | 4 |
| CRC | 3 | 2 |
| Data length (Tx/Rx) | 86/22 | 86/22 |
| Total (bytes) | 108/44 | 98/34 |
| Duration @ 2 MBit | 432/176 µs | 392/136 µs |
| Total bandwidth (1TX/1RX) | 432+176+40+40 = 788 µs | 392+136+40+40 = 608 µs |

*FIG. 3*

Time Over-The-Air for an HID Device (Proprietary Communications Protocol)

Parameters:
HID upstream : 20 bytes
HID downstream : 20 bytes
Turnaround time = 40 μs

| Reports | Transceiver | Device HID 1 | Device HID 2 |
|---|---|---|---|
| SOF | 1 | 1 | 1 |
| Address | 4 | 4 | 4 |
| Header | 1 (Length) 1 (Ctrl Field) | 1 (Length/Fc Field) | 1 (Length/Fc Field) |
| Data length | 20 (Tx HID1) | 20 | 20 |
| MIC | 4 | 4 | 4 |
| CRC | 2 | 2 | 2 |
| Data length | 20 (Tx HID2) | | |
| MIC | 4 | | |
| CRC | 2 | | |
| Total (bytes) | 59 | 32 | 32 |
| Duration @ 2 MBit | 236 μs | 128 μs | 128 μs |
| Total time | 236+128+128 = 492 μs | | |

FIG. 8

Time Over-The-Air for Two HID Devices

| | BLE | Proprietary Communication Protocol (Round Robin) | Proprietary Communication Protocol (RLI) |
|---|---|---|---|
| Total bandwidth (μs) | 832 μs | 672 μs | 492 μs |

*FIG. 9*

Time Over-The-Air for an HID + Audio Device
(Proprietary Communications Protocol - RLI)

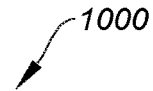

Parameters:
HID upstream : 20 bytes
HID downstream : 20 bytes
Turnaround time = 40 μs
Audio stream : 48 kHz stereo, 24 bits, compression 3.33 bit/sample -> 86 bytes
Microphone : 24 kHz mono, 24 bits, compression rate 3.33 bit/sample -> 22 bytes

| Reports | Transceiver | Device HID 1 | Device HID 2 | Device Audio |
|---|---|---|---|---|
| SOF | 1 | 1 | 1 | 1 |
| Address | 4 | 4 | 4 | 4 |
| Header | 1 (Length)<br>1 (Ctrl Field) | 1 (Length/Fc Field) | 1 (Length/Fc Field) | 1 (Length/Fc Field) |
| Data length | 20 (Tx HID1) | 20 | 20 | 22 |
| MIC | 4 | 4 | 4 | 4 |
| CRC | 2 | 2 | 2 | 2 |
| Data length | 20 (Tx HID2) | | | |
| MIC | 4 | | | |
| CRC | 2 | | | |
| Data length | 86 (Tx audio) | | | |
| MIC | 4 | | | |
| CRC | 2 | | | |
| Total (bytes) | 151 | 32 | 32 | 34 |
| Duration @ 2 MBit | 604 μs | 128 μs | 128 μs | 136 μs |
| Total time | 996 μs | | | |

FIG. 10

Time Over-The-Air for Two HID Devices + Audio Devices

| | BLE | Proprietary Communication Protocol (Round Robin) | Proprietary Communication Protocol (RLI) |
|---|---|---|---|
| Total bandwidth (μs) | 788 μs (Audio) + 832 μs (HID) = 1620 μs | 608 μs (Audio) + 672 μs (HID) = 1280 μs | 996 μs |

*FIG. 11*

WIRELESS COMMUNICATION PROTOCOL WITH PERIPHERAL DEVICES

CROSS-REFERENCES TO RELATED APPLICATIONS

This application claims the benefit and priority of U.S. Provisional Application No. 62/751,705, filed on Oct. 28, 2018, and titled "WIRELESS COMMUNICATION PROTOCOL WITH PERIPHERAL DEVICES," which is hereby incorporated by reference in its entirety for all purposes.

BRIEF SUMMARY

In some embodiments, a transceiver can be configured to wirelessly transfer data between a host computing device and a plurality of computer peripheral devices over a communication path using a communication data construct sent by the transceiver comprising: a plurality of packet structures forming a communication protocol configured for transferring peripheral device data between the host device and the plurality of computer peripheral devices, wherein each of the packet structures of the plurality of packet structures includes: a single destination address configured to identify which of the plurality of computer peripheral devices will receive the peripheral device data from the host computing device in the present packet structure and which of the plurality of computer peripheral devices will not receive the peripheral device data from the host computing device in a present packet structure; and a data field configured to contain peripheral operational data for each of the plurality of computer peripheral devices. The peripheral device data can include at least one of human interface device (HID) data, audio data, or image data.

In certain embodiments, the transceiver can be further configured to receive the peripheral device data from each of the plurality of computer peripheral devices, wherein the peripheral device data from each of the plurality of computer peripheral devices includes: an address uniquely identifying the particular computer peripheral device; and data corresponding to usage of the particular computer peripheral device. Each of the packet structures can include control data configured to cause the each of the plurality of computer peripheral devices to send their corresponding data during a time period that is offset from the data received from the other computer peripheral devices in a time-division-multiplexed (TDM) schema. In some aspects, the control data is further configured to cause all of the peripheral device data received from each of the plurality of peripheral devices to be sent within a receive window not to exceed a predetermined duration. The transceiver can be configured to switch from a transmit mode to a receive mode after sending each of the packet structures. A combined duration of each packet structure, a corresponding switch from the transmit mode to the receive mode, and a corresponding receive window for said each packet structure can be set to be less than or equal to 1 ms, although other upper limits may be set accordingly (e.g., 0.8 ms, 1.5 ms, 2 ms, 5 ms, etc.). In some cases, the single destination address designates: each of the plurality of computer peripheral devices to receive the operational data in the present packet; and each of the plurality of computer peripheral devices not to receive the operational data in the present packet. Each packet structure may further contain data causing each of the plurality of computer peripheral devices designated to receive operational data in the present packet to power down after receiving the corresponding operational data from the present packet structure. In some cases, each packet structure may further contain data causing each of the plurality of computer peripheral devices not designated to receive operational data in the present packet to power down or stop receiving data from the present packet structure. In some embodiments, each of the packet structures includes at least one check value configured to cause each of the peripheral devices to use the check value to verify data integrity of data within the packet structure.

In further embodiments, a method for wirelessly transferring data between a host computing device and a plurality of computer peripheral devices over a communication path, the method comprising: generating a packet structure that includes: a single destination address configured to identify which of the plurality of computer peripheral devices will receive peripheral device data from the host computing device in the present packet structure and which of the plurality of computer peripheral devices will not receive the peripheral device data from the host computing device in a present packet structure; and a data field configured to contain peripheral operational data for each of the plurality of computer peripheral devices; and wirelessly transmitting the packet structure from a transceiver coupled to the host computing device to the plurality of computer peripheral devices. The peripheral device data may include at least one of human interface device (HID) data, audio data, or image data. In some aspects, the packet structure includes control data configured to cause the each of the plurality of computer peripheral devices to send their corresponding peripheral device data during a time period that is offset from the peripheral device data received from the other computer peripheral devices in a time-division-multiplexed (TDM) schema. The control data can be configured to cause all of the data received from each of the plurality of peripheral devices to be sent within a receive window not to exceed a predetermined duration.

In some embodiments, the method may further comprise: causing a transceiver coupled to the host computing device to switch from a transmit mode to a receive mode after sending the packet structure. In some implementations, the duration of the packet structure, a corresponding switch from the transmit mode to the receive mode, and a corresponding receive window for the packet structure is less than or equal to 1 ms, although other durations are possible (e.g., 0.8 ms, 1.2 ms, 1.5 ms, 2 ms, 5 ms, etc., as would be appreciated by one of ordinary skill in the art with the benefit of this disclosure). The single destination address may designate: each of the plurality of computer peripheral devices to receive the operational data in the present packet; and each of the plurality of computer peripheral devices not to receive the operational data in the present packet. The packet structure can further contain data causing each of the plurality of computer peripheral devices designated to receive operational data in the present packet to power down after receiving the corresponding operational data from the present packet structure. In some cases, the packet structure can contain data causing each of the plurality of computer peripheral devices not designated to receive operational data in the present packet to power down or stop receiving data from the present packet structure.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

FIG. 2 is a table showing a packet format for a Human Interface Device (HID) over a number of wireless communication protocols, according to certain embodiments.

FIG. 3 is a table showing a packet format for audio data over a number of wireless communication protocols, according to certain embodiments.

FIG. 8 shows a table illustrating the bandwidth for two HID devices using a proprietary communication protocol and a reduced latency interaction, according to certain embodiments.

FIG. 9 shows a table showing time over-the-air for two HID reports and an audio device over a number of communication protocols, according to certain embodiments.

FIG. 10 shows a table showing a bandwidth for two HID devices and an audio device using the proprietary communication protocol with reduced latency interaction, according to certain embodiments.

FIG. 11 shows a table showing time over-the-air for various peripheral device types over a number of communication protocols and turnaround schemes including round robin and the reduced latency interaction, according to certain embodiments.

DETAILED DESCRIPTION

Figure 1:
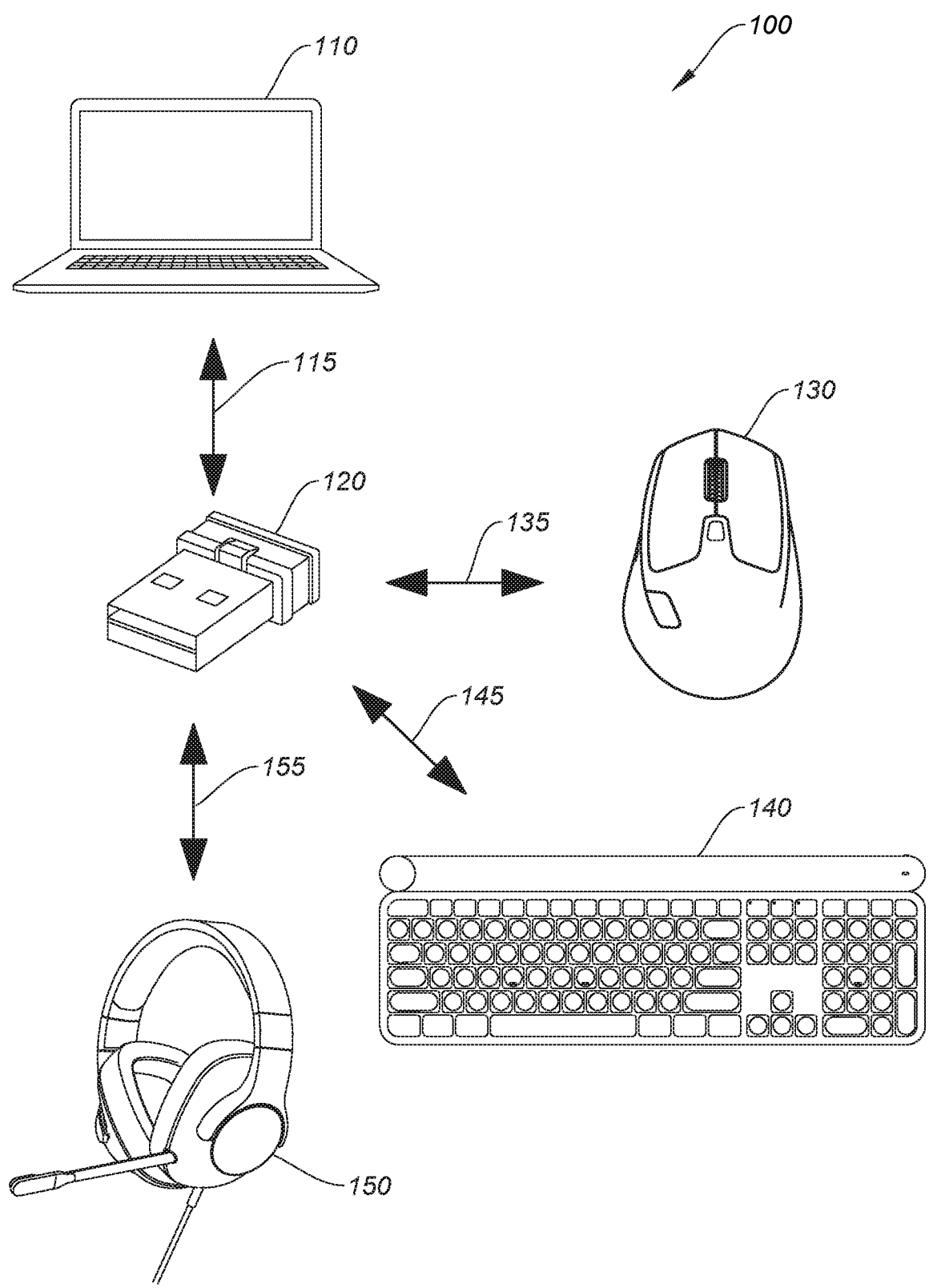
FIG. 1 shows a system including host computing device coupled to a plurality of peripheral computer devices via a wireless transceiver, according to certain embodiments, according to certain embodiments.

Aspects of the present disclosure relate generally to electronic communication in a computing environment, and more particularly to wireless communication protocol configured for low latency and high performance in a network comprising a host computing device and a plurality of peripheral devices, according to certain embodiments.

In the following description, various examples of communication protocols and corresponding packet and/or frame structures are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to various novel communication protocols with low-latency and high performance characteristics that can be well-suited for modern computing systems that run software with demanding operating requirements, such as gaming rigs. Over the last few decades, the advent of wireless communication protocols like Bluetooth® and BLE® has spurred innovation in connectivity between host computing devices and computer peripheral devices ("peripheral device") such that most peripheral devices have migrated from direct connected, hard-wired connections to wireless communication with one or more host computing devices. In many systems, these wireless communication protocols may be implemented over a Universal Serial Bus (USB) connected network, which may include multiple peripheral devices all communication through a USB hub (e.g., dongle) to a host computer device, as would be appreciated by one of ordinary skill in the art with the benefit of this disclosure (e.g., as shown in FIG. 1).

Despite the improvements, some video game applications require very fast player response times and conventional wireless communication protocols (e.g., BLE) often do not provide acceptable performance metrics (e.g., computer mouse report rates) for the more discerning of gamers in the higher echelons of competitive e-sports. For example, a 1 ms report rate for a computer mouse is often touted as a preferred performance benchmark. Some modern computer mice, such as the Logitech G603 "Lightspeed" mouse, can achieve report rates over a USB transceiver at 1 ms or less in certain configurations. However, when multiple peripherals are connected to the common USB hub, such as a keyboard, audio headset, and/or other peripheral devices (e.g., printer, microphone, presenter device, etc.), achieving USB report rates at 1 ms may not be possible with conventional devices. For example, other manufacturers often benchmark at 5 ms or more with a mouse alone, and with particularly longer latencies when combined with other peripheral devices on the same hub (e.g., common piconet with master (host computer) and slave (peripheral devices) relationship).

Figure 4:
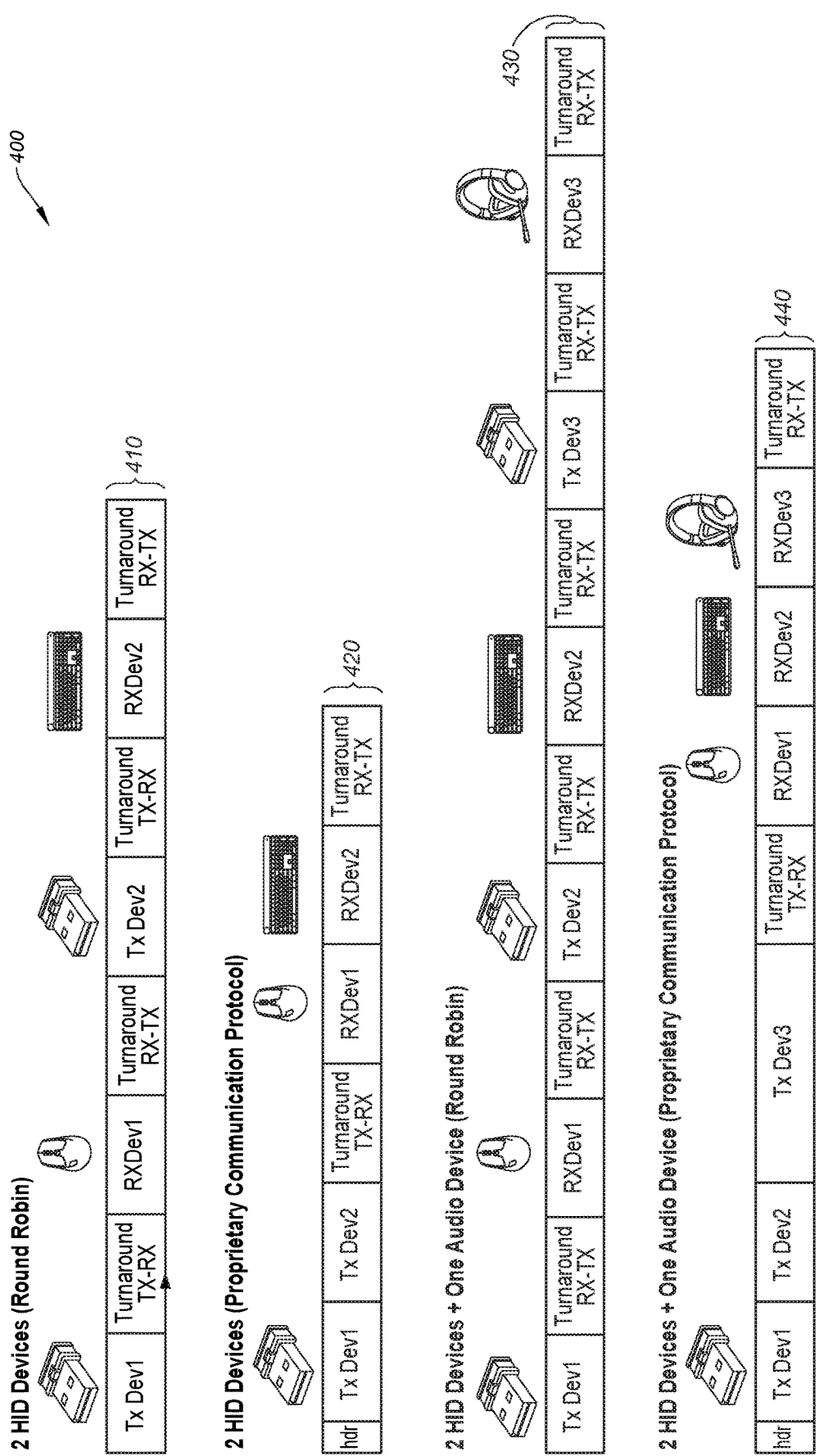
FIG. 4 shows a sequence diagram depicting the order of transmit/receive operations between a host computing device and a plurality of peripheral devices over a number of different communication protocols, according to certain embodiments.
Figure 5:
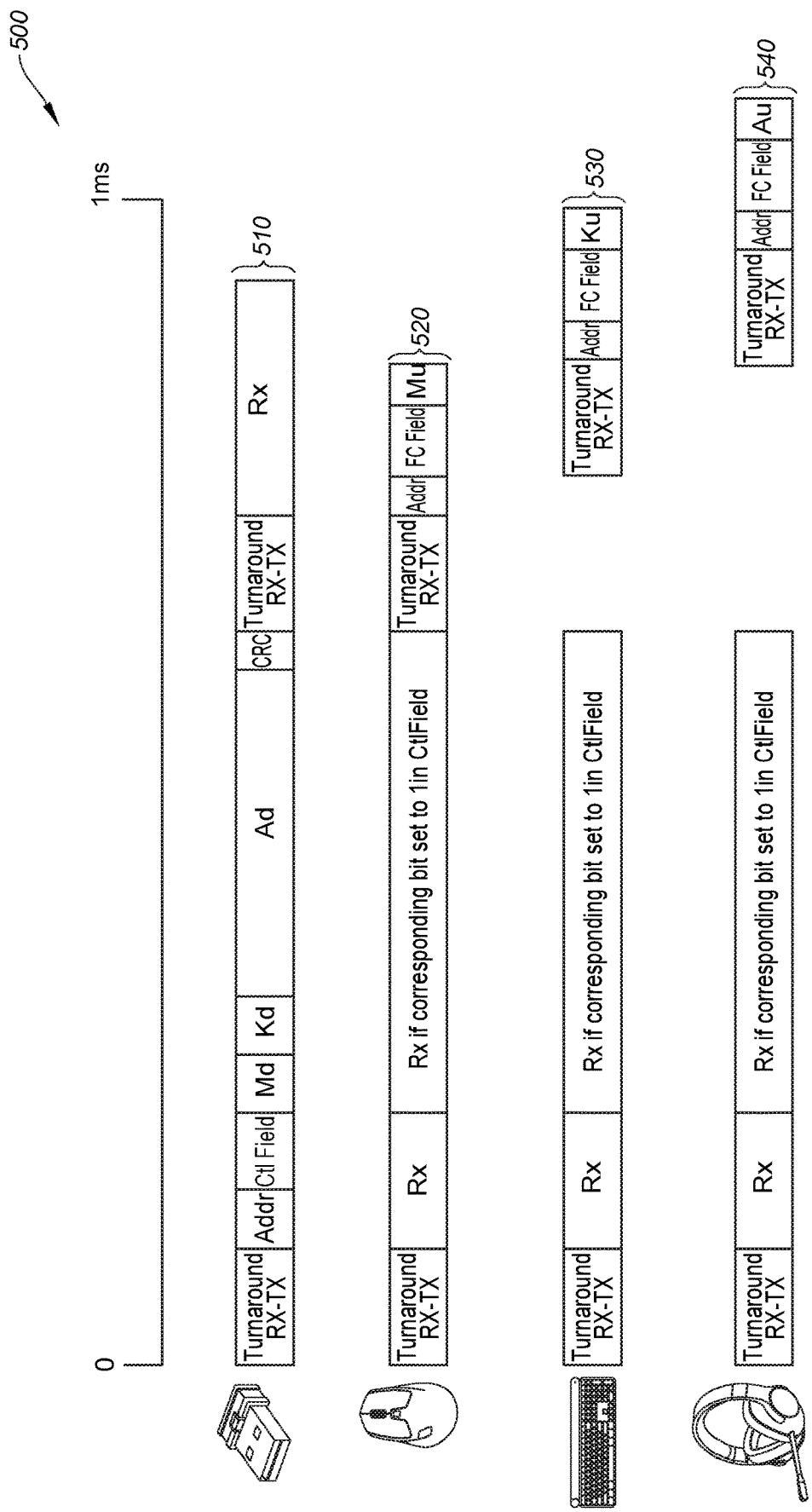
FIG. 5 shows a sequence diagram depicting transmit/receive operations between a host computing device and a plurality of peripheral devices using the proprietary communications protocol over a predetermined time duration, according to certain embodiments.
Figure 7:
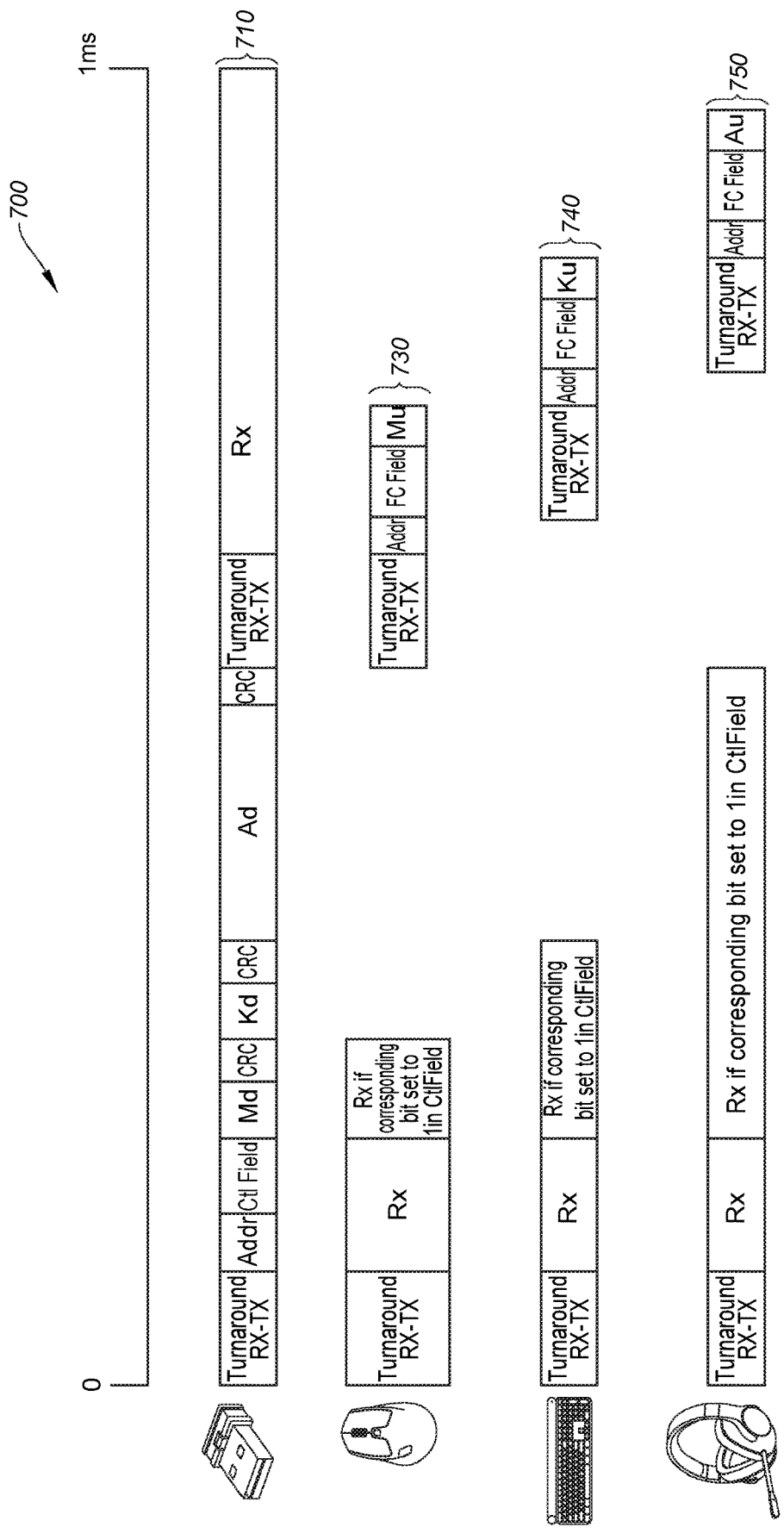
FIG. 7 shows a sequence diagram depicting transmit/receive operations between a host computing device and a plurality of peripheral devices over a communications protocol over a predetermined time and with reduced power dissipation, according to certain embodiments.

Aspects of the invention can materially improve latency associated with the request/response protocol described herein to support multiple devices on the same transceiver, which are represented in the following embodiments as a mouse/keyboard/headset-based systems. The improvement can be achieved by changing how the host computing device communicates with the peripheral devices through the (e.g., USB) transceiver. For example, conventional systems may communication with a plurality of peripheral devices in a "round robin" fashion, where a transceiver sends data to a first peripheral device, switches from transmit (Tx) to receive (Rx) mode (the "turnaround"), receives data from the first peripheral device, switches from Rx to Tx, then sends data to the second peripheral device, etc. One way to improve latency is to reduce of the number of Tx/Rx turnarounds (e.g., often 2×40 µs per peripheral and sometimes up to 6×40 µs in three-peripheral device systems) by sending data (Tx) to all peripherals first, then performing the "turnaround" and receiving (Rx) from all peripherals afterwards. An example is shown in FIG. 4 for a number of wireless protocols, according to certain embodiments. In order to do this, some embodiments may employ a unique addressing scheme in a communication protocol (e.g., the address field in a data packet/frame) that all peripherals can be configured to listen for. Once all instructions from the host computer (referred to as "operational data") is sent, then each peripheral can respond after the turnaround. In some cases, the peripheral devices may respond with an offset relative to each other (e.g., time-division multiplexed schema), using frequency hopping (e.g., between frames within the same channel), using both, or other method of reducing the likelihood of data overlaps that could result in errors, data corruption, or other deleterious effects. An example is shown in FIG. 5. In some cases, further power saving features, such as having the peripheral devices (often running on power limited batteries) reduce power (e.g., shut down) if the host computing device does not have operation data for that device in a current packet. An example of this is shown in FIG. 7. In summary, a dongle (e.g., USB transceiver) can transmit on the same channel for multiple devices (e.g., mouse, keyboard, and headset) using the same address (e.g., BLE, or 3 LSB of address) to broadcast to multiple peripherals, with each peripheral device acknowledging independently with their own address (e.g., BLE address), where the timing of the acknowledgement can be predetermined (e.g., TDM). These embodiments and more are further discussed below in more detail.

FIG. 1 shows a system 100 including host computing device 110 coupled to a plurality of peripheral computer devices 130-150 via a wireless transceiver 120, according to certain embodiments. Host computer 110 may include any suitable computing device, such as a desktop computer, laptop computer, tablet computer, wearable computing device (e.g., head-mounted display, smart watch, etc.), entertainment/infotainment system, vehicle computing systems, or other suitable computing device. Although one host computing device is shown, it should be understood that multiple computing devices may be used in the embodiments that follow. For example, each peripheral device 130-150 may be coupled to multiple host computing devices (e.g., but one active connection at a time). Transceiver 120 can be coupled to host computer via a wired or hardwired connection. For example, transceiver 120 may be USB transceiver (referred to as a "dongle") that is socketed in host computer 110. Some transceivers may be wirelessly coupled to host computer 110. The peripherals can be any suitable computer peripheral device, however the examples shown here are typically found in conventional gaming rigs. For instance, peripheral device 130 may be a computer mouse, peripheral device 140 can be a keyboard, and peripheral device 150 can be an audio headset with or without a microphone. Other peripherals can be added or removed, however aspects of the present invention are generally well suited for provided material improvements in latency for multi-peripheral systems. One of ordinary skill in the art with the benefit of this disclosure would appreciate the many modifications, variations, and alternative embodiments thereof.

FIG. 2 is a table 200 showing a packet format for a Human Interface Device (HID) over a number of wireless communication protocols, according to certain embodiments. More specifically, table 200 shows an example of measurements for time over-the-air for HID devices for both a BLE communication protocol and a proprietary communication protocol using a round robin type interaction with the HID devices. It can be assumed that HID upstream and HID downstream packets are 20 bytes for the purposes of this description, although other packet sizes with more or less bytes can be used. A HID device may include any peripheral device described throughout this disclosure (e.g., computer mouse, keyboard, presenter device, audio device, audio device and microphone, etc.) or that would be contemplated by one of ordinary skill in the art with the benefit of this disclosure. It should be noted that some devices, such as audio device, may transmit audio data in addition to or instead of HID data, as would be appreciated by one of ordinary skill in the art with the benefit of this disclosure.

Table 200 includes HID report data fields including start-of-frame (SOF), address, header data (including header, length, CID, opcode, handle), MIC, cyclic redundancy check (CRC), HID reports, total (in bytes), duration @ 2 Mbit, and total bandwidth for a single transmit and receive, as would be appreciated by one of ordinary skill in the art with the benefit of this disclosure.

FIG. 3 includes a table 300 that shows a packet format for audio data over a number of wireless communication protocols, according to certain embodiments. Specifically, table 300 shows time over-the-air for an audio device in both BLE and the propriety communication protocol using a round robin type interaction with an audio device. It can be assumed that the audio stream data is 48 kHz stereo, 24 bits, with a compression ratio of 3.33 bits/sample at 86 bytes. For a microphone, it can be assumed its audio data is 24 kHz mono, 24 bits, with a compression ratio of 3.33 bits/sample at 22 bytes. Table 300 is presented in a similar manner as Table 200 and includes the same communication protocols, but for audio/microphone data rather than HID data like mouse or keyboard commands.

FIG. 4 shows a set of sequence diagrams 400 depicting the order of transmit/receive operations between a host computing device and a plurality of peripheral devices (sometimes referred to as "devices" for brevity) over a number of different communication protocols, according to certain embodiments. It should be noted that the embodiments shown and described herein utilize a single channel, however some embodiments may employ multiple channels. Referring to diagram 400, sequence diagram 410 shows 2 HID devices in communication with a host computer via a USB dongle using a conventional communication protocol employing a round robin fashion of communication. For example, in the conventional communication protocol (e.g., BLE), the transceiver first transmits to device 1, then switches from transmit to receive (referred to as "turnaround Tx/Rx"), followed by a receive period from device 1. The conventional protocol continues with a switch from receive mode to transmit mode (referred to as "turnaround Rx/Tx") to initiate transmit mode to device 2, followed by another turnaround Tx/Rx, and a receive from device 2. More devices would follow in a similar pattern. As described above, the latency associated with the communication sequence can be materially improved by reducing the number of turnarounds.

Sequence diagram 420 shows two HID devices communicating via the proprietary communication protocol using a non-round robin style interaction, which can be referred to as the reduced latency interaction (RLI). In contrast to the conventional round robin fashion of communication, the transceiver transmits to both the first device (e.g., mouse) and the second device (e.g., keyboard) in succession before the turnaround Tx/Rx, and follows with a receive window for the first device and second device in succession. Thus, the number of turnarounds reduces from three to one. With three peripheral devices (e.g., a mouse, keyboard, and audio device), the number of turnarounds in a conventional round robin approach (e.g., see sequence diagram 430) would be five, as compared to a single turnaround in the reduced latency interaction, as shown in sequence diagram 440. This can be extrapolated in a similar fashion with more peripheral devices, as would be appreciated by one of ordinary skill in the art with the benefit of this disclosure.

Figure 6:
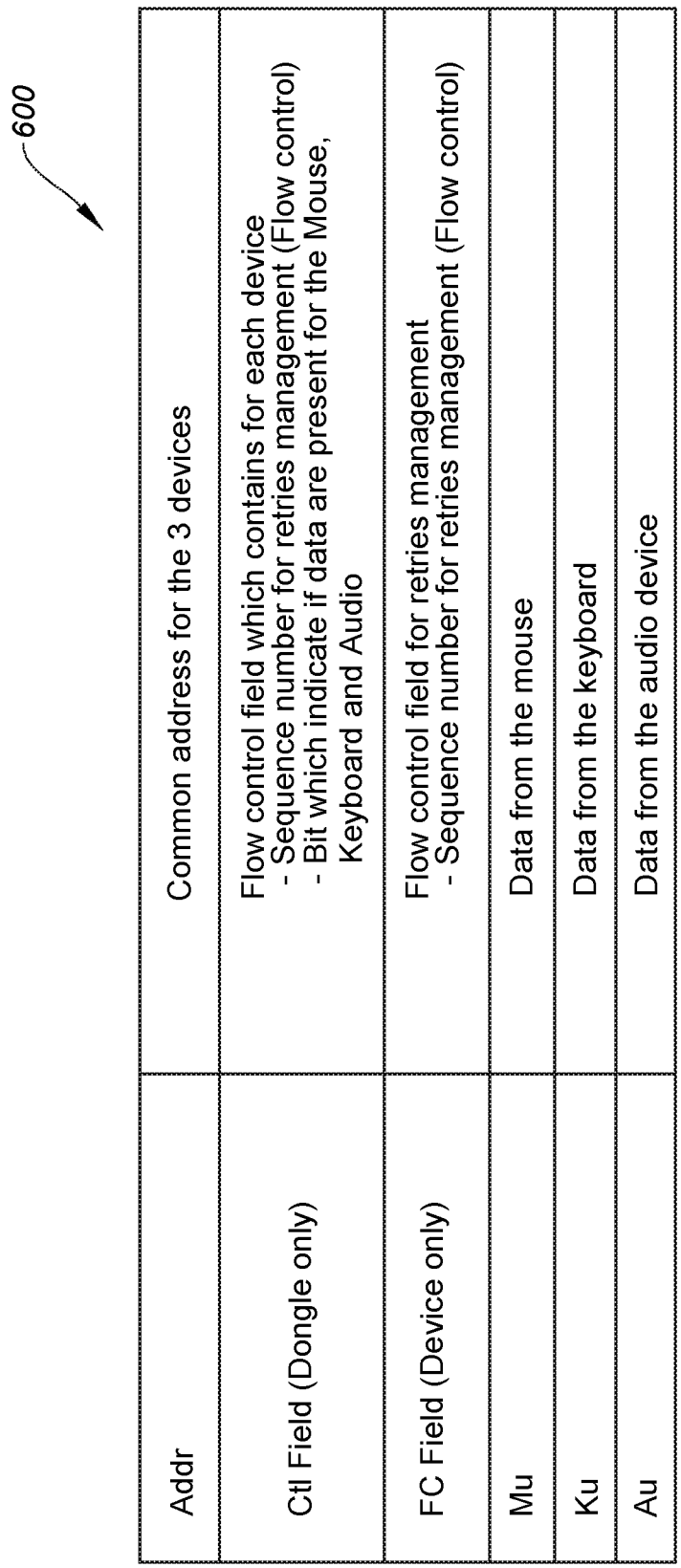
FIG. 6 shows a table depicting contents of the packet structures presented in the sequence diagram of FIG. 5, according to certain embodiments.

FIG. 5 shows a sequence diagram 500 depicting transmit/receive operations between a host computing device 110 and a plurality of peripheral devices 130-150 using the proprietary communications protocol over a predetermined time duration (1 ms), according to certain embodiments. Packet structure 510 shows transmit and receive operations for the transceiver 120. Packet structure 520 shows receive and transmit operations for first peripheral device 130, packet structure 530 shows receive and transmit operations for first peripheral device 140, and packet structure 540 shows receive and transmit operations for first peripheral device 150. Some definitions of the contents of packet structures 510-540 are presented in FIG. 6 and are referred to in the description that follows.

Packet structure 510 can include an address field, followed by a control field, operational data for device 1 (mouse M), operational data for device 2 (keyboard K), operational data for device 3 (audio headset A), a cyclic redundancy check (CRC), and a receive field to receive data from each of the devices 1-3 (e.g., peripheral devices 130-150). The address field can be a common address for each of the devices. As such, all of the devices may be configured to listens for transmit data from the host device during their corresponding periods within the predetermined time. The control field may contain for each peripheral device a sequence number for retries management (e.g., SNTx, SNRx) and/or a data (e.g., a bit) indicating if data is present for the device 1, device 2, or device 3 (Md/Kd/Ad respectively). Note that the 3 bits used to indicate whether data is present in the packet structure can be used as LSB of the address in some implementations. Referring to packet structure 510, each corresponding transmit time is designated Md, Kd, and Ad accordingly. After transmitting to the three peripheral devices and the CRC, the host device transceiver 110 switches from Tx to Rx (a single turnaround) and listens for data from each peripheral device. Periods Mu, Ku, and Au may be configured in any suitable order, and may be appropriated longer or shorter time slots (e.g., but maintaining the overall predetermined time goal).

Packet structure 520 for peripheral device 130 includes a receive field where it "listens" for the broadcast from transceiver 110, as described above. Peripheral device 130 may subsequently receive operational data (e.g., turning on/off LEDs on the mouse, changing a mode of operation scroll wheel ratchet mode to smooth rotation mode, change tracking resolution of the mouse, etc.), for example, if the corresponding Rx bit is set to 1 (control field indicated that operational data was present). After the CRC in packet 510 (from transceiver 110), the mouse can provide its unique address and mouse data (e.g., movement data, button presses, etc.) during a period of time. In some cases, the mouse may send data during a preset periods in a time-division multiplexed (TDM) manner where each peripheral device is afforded a particular period of time per packet structure to send data. Packet structure 530 and 540 operate similarly in that both can have a receive window during the same time as peripheral device 130 and each can receive data from the transceiver as a "global" address is provided that is configured to designate all peripheral devices in the network (or a subset thereof). Each peripheral 140 150 can then receive their corresponding operational data (e.g., LEDs on the keyboard, audio data for the headset, etc.), and the each peripheral device can provide its unique address followed by their corresponding HID data (e.g., keystrokes on the keyboard). Alternatively or additionally, each peripheral device may employ frequency hopping (in addition to or in lieu of TDM arrangements) when sending data back to host computer 110. One of ordinary skill in the art with the benefit of this disclosure would appreciate the many modifications, variations, and alternative embodiments thereof, however some preferred embodiments keep the peripheral data within a particular time frame (e.g., the Rx period in packet 510) to help achieve the predetermined time frame (in this case 1 ms).

Note that some embodiments may include addresses that are configured address multiple peripheral devices, but not all. For example, some embodiments may address the mouse and keyboard only, but on the headphones. Some packets may include an address that only instructs one of the three peripherals to listen for data. Furthermore, the operational data fields in packets 520-540 may be partitioned in a TDM-type arrangement, or may be configured to cause each peripheral device to shut down after receiving its corresponding data, or if no data is to be provided in that particular packet (as indicated by the control field of transceiver packet 510). One of ordinary skill in the art with the benefit of this disclosure would appreciate the many modifications, variations, and alternative embodiments thereof.

Power Saving Embodiments

In some embodiments, power consumption may be reduced by adding additional CRC (2 or 3 bytes) to the message in order to stop or reduce the Rx for each peripheral device. Additional MICs (Message integrity check) may also be added for security reasons, as would be appreciated by one of ordinary skill in the art with the benefit of this disclosure.

FIG. 7 shows a sequence diagram 700 depicting transmit/receive operations between a host computing device 110 and a plurality of peripheral devices 130-150 over a communications protocol over a predetermined time (1 ms) and with reduced power dissipation, according to certain embodiments. Packet structure 710 shows transmit and receive operations for the transceiver 120. Packet structure 730 shows receive and transmit operations for first peripheral device 130, packet structure 740 shows receive and transmit operations for first peripheral device 140, and packet structure 750 shows receive and transmit operations for first peripheral device 150. Some definitions of the contents of packet structures 710 and 730-750 are presented in FIG. 6 and are referred to in the description that follows.

FIG. 7 and the corresponding description can be similar to the description for FIG. 5 above, but for the changes to the packet structure 710 that can reduce power consumption in the peripheral devices 730-750. Note that instead of a single CRC and subsequent receive block (post tx/rx turnaround in packet structure 510), additional CRC fields are provided after each set of operational data is transmitted by transceiver 110. That is, after the control field, mouse operational data is sent, followed by a first CRC, then keyboard operational data is sent, followed by a second CRC, and finally the audio operation data is sent, followed by the final CRC, which can then trigger the Tx/Rx turnaround in transceiver 110, as described above. Each peripheral device can be configured to stop receiving in two scenarios. In a first scenario, where the mouse is addressed and there is mouse operational data, the mouse can receive the data, verify that no more mouse data is coming (via the first CRC), the mouse may cease receiving (e.g., shut down the receiver function in the mouse). In a second scenario, where the mouse is addressed and no data is indicated as being present, the mouse may shut down receiving operations momentarily (during the period defined in packet structure 710), as described above. Likewise, the keyboard and headset can operate similarly, as would be appreciated by one of ordinary skill in the art with the benefit of this disclosure. Note that the Rx period for each peripheral in FIG. 7 shows that the Rx periods remains on until a CRC (when the peripheral device knows that no further operational data is present) is received, such that each subsequent peripheral device has a longer Rx period. In some embodiments, the relative windows for transferring operational data to each peripheral device may be known and, in such cases, the peripheral device may only power on receive functionality during those known periods where it expects to receive operational data. One of ordinary skill in the art with the benefit of this disclosure would appreciate the many modifications, variations, and alternative embodiments thereof.

Certain Embodiments of the Low-Latency Communications Protocol and Packet Structure In some embodiments, a transceiver can be configured to wirelessly transfer data between a host computing device and a plurality of peripheral devices over a communication path using a communication data construct sent by the transceiver comprising: a plurality of packet structures (e.g., a sequence of packet structure 510) forming a communication protocol (e.g., with reduced latency interaction) for communicating human interface device (HID) between the host device (110) and the plurality of peripheral devices (130-150). Each of the packet structures of the plurality of packet structures can include: a single destination address configured to identify which of the plurality of computer peripheral devices will receive peripheral device data (e.g., HID data, audio data, image data, etc.) from the host computing device in the present packet structure and which of the plurality of computer peripheral devices will not receive peripheral device data from the host computing device in a present packet structure; and a data field configured to contain peripheral operational data for each of the plurality of computer peripheral devices. In some embodiments, the transceiver can be further configured to receive peripheral device data from each of the plurality of computer peripheral devices, wherein the peripheral device data from each of the plurality of computer peripheral devices includes: an address uniquely identifying the particular computer peripheral device; and data corresponding to usage of the particular computer peripheral device.

In some cases, each of the packet structures may include control data configured to cause each of the plurality of computer peripheral devices to send peripheral device data back to the host computing device on a different frequency than each other of the plurality of computer peripheral devices via a frequency hopping protocol. In some cases, each of the packet structures includes control data configured to cause the each of the plurality of computer peripheral devices to send their corresponding peripheral device data during a time period that is offset from the peripheral device data received from the other computer peripheral devices in a TDM schema. The control data can be further configured to cause all of the peripheral device data received from each of the plurality of peripheral devices to be sent within a receive window not to exceed a predetermined duration. The transceiver can be configured to switch from a transmit mode to a receive mode after sending each of the packet structures. In some cases, a duration of each packet structure, a corresponding switch from the transmit mode to the receive mode, and a corresponding receive window for said each packet structure is less than or equal to 1 ms. In certain embodiments, the single destination address may designate: each of the plurality of computer peripheral devices to receive the operational data in the present packet; and each of the plurality of computer peripheral device not to receive the operational data in the present packet. Each packet structure can further contain data causing each of the plurality of computer peripheral devices designated to receive operational data in the present packet to power down after receiving the corresponding operational data from the present packet structure. Each packet structure can further contains data causing each of the plurality of computer peripheral devices not designated to receive operational data in the present packet to power down or stop receiving data from the present packet structure. Each of the packet structures may include at least one check value configured to cause each of the peripheral devices to use the check value to verify data integrity of data within the packet structure.

FIG. 8 shows a table 800 illustrating the bandwidth for 2 HID devices using the proprietary communication protocol and the reduced latency interaction, according to certain embodiments. Assumptions include that a turnaround time for a fast ramp up is equal to 40 µs. FIG. 9 shows a table 900 showing time over-the-air for two HID devices over a number of communication protocols including BLE with round robin interaction, the proprietary communication protocol over round robin interaction, and the proprietary communication protocol using the reduced latency interaction, according to certain embodiments. FIG. 10 shows a table 1000 showing a bandwidth for two HID devices and an audio device using the proprietary communication protocol with reduced latency interaction, according to certain embodiments. Assumptions include that a turnaround time for a fast ramp up is equal to 40 µs. FIG. 11 shows a table 1100 showing time over the air for two HID devices and an audio device over a number of communication protocols, including BLE with round robin interaction, the proprietary communication protocol over round robin interaction, and the proprietary communication protocol using the reduced latency interaction, according to certain embodiments.

Figure 12:
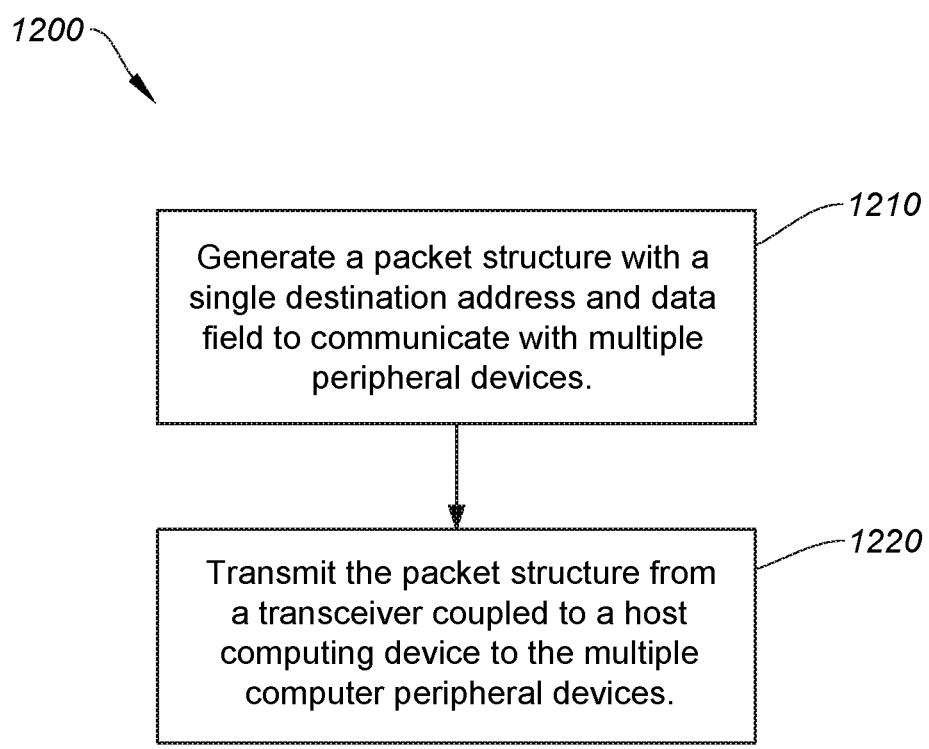
FIG. 12 is a simplified flow chart showing aspects of a method for wirelessly transferring data between a host computing device and a plurality of computer peripheral devices over a communication path, according to certain embodiments.

FIG. 12 is a simplified flow chart showing aspects of a method 1200 for wirelessly transferring data between a host computing device and a plurality of computer peripheral devices over a communication path, according to certain embodiments. Method 1200 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1200 can be performed by aspects of host computing device 110.

At operation 1210, method 1200 can include generating a packet structure, according to certain embodiments. The packet structure can include a single destination address and a data field. The single destination address can be configured to identify which of the plurality of computer peripheral devices will receive peripheral device data from the host computing device in the present packet structure and which of the plurality of computer peripheral devices will not receive the peripheral device data from the host computing device in a present packet structure. In some cases, the data field can be configured to contain peripheral operational data for each of the plurality of computer peripheral devices. Peripheral operational data may be, for example, control signals that cause a mouse to activate certain LEDs in a particular sequence, activate a haptic feedback, set button or scroll wheel operational settings (e.g., ratchet vs. smooth rotational settings), cause a keyboard to configure the operation of one or more alphanumeric keys, send audio data to audio speakers in a headset, or any other data that sent to or received from a peripheral device, as would be appreciated by one of ordinary skill in the art with the benefit of this disclosure.

At operation 1220, method 1200 can include wirelessly transmitting the packet structure from a transceiver coupled to the host computing device to the plurality of computer peripheral devices, according to certain embodiments. In some aspects, the peripheral device data can include at least one of human interface device (HID) data, audio data, or image data. In some embodiments, the packet structure may include control data configured to cause the each of the plurality of computer peripheral devices to send their corresponding peripheral device data during a time period that is offset from the peripheral device data received from the other computer peripheral devices in a time-division-multiplexed (TDM) schema. The control data can be further configured to cause all of the data received from each of the plurality of peripheral devices to be sent within a receive window not to exceed a predetermined duration. The predetermined duration may be set based on a total bandwidth limit (duration of the packet structure), which may be a default value or set by a user, as would be appreciated by one of ordinary skill in the art with the benefit of this disclosure. In some cases, a combination of a duration of the packet structure, a corresponding switch from the transmit mode to the receive mode, and a corresponding receive window for the packet structure is less than or equal to 1 ms, or other suitable time duration (e.g., 1 ms, 2 ms, 0.8 ms, 5 ms, etc.).

In certain embodiments, the method can include causing a transceiver coupled to the host computing device to switch from a transmit mode to a receive mode after sending the packet structure. In some cases, the single destination address can designate each of the plurality of computer peripheral devices to receive the operational data in the present packet and each of the plurality of computer peripheral devices not to receive the operational data in the present packet. The packet structure can further contain data causing each of the plurality of computer peripheral devices designated to receive operational data in the present packet to power down after receiving the corresponding operational data from the present packet structure. Alternatively or additionally, the packet structure can further contain data causing each of the plurality of computer peripheral devices not designated to receive operational data in the present packet to power down or stop receiving data from the present packet structure.

It should be appreciated that the specific steps illustrated in FIG. 12 provide a particular method 1200 for wirelessly transferring data between a host computing device and a plurality of computer peripheral devices over a communication path, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 13:
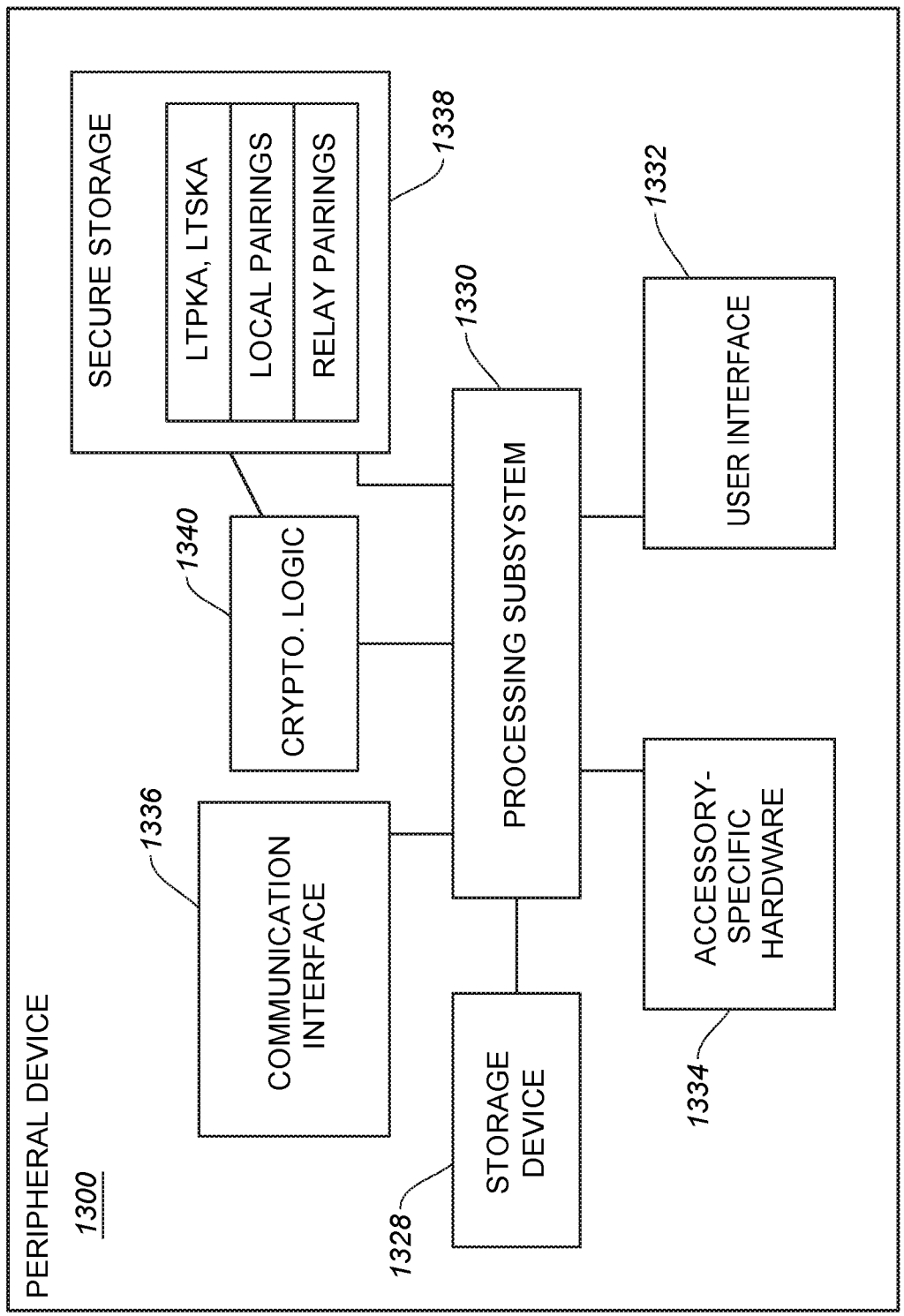
FIG. 13 shows a simplified block diagram of an example peripheral device, according to certain embodiments.

FIG. 13 shows a simplified block diagram of an example peripheral device 1300, according to certain embodiments. Peripheral device 1300 can implement any or all of the peripheral device functions, behaviors, and capabilities described herein, as well as other functions, behaviors, and capabilities not expressly described. Peripheral device 1300 can include storage device 1328, processing subsystem 1330, user interface 1332, peripheral device-specific hardware 1334, communication interface 1336, secure storage module 1338, and cryptographic logic module 1340. Peripheral device 1300 can also include other components (not explicitly shown) such as a battery, power media access devices, and other components operable to provide various enhanced capabilities.

Peripheral device 1300 is representative of a broad class of devices that can be used in conjunction with a host device such as but not limited to mice, keyboards, audio headsets, cameras, conferencing systems, printers and the like. Various accessories may include components not explicitly shown in FIG. 13, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1328 can be implemented, e.g., using disk, flash memory, or any other non-transitory storage medium, or a combination of media, and can include volatile and/or non-volatile media. In some embodiments, storage device 1328 can store one or more programs (e.g., firmware) to be executed by processing subsystem 1330, including programs to implement various operations described above as being performed by a peripheral device, as well as operations related to particular peripheral device behaviors. Storage device 1328 can also store a peripheral device object or peripheral device definition record that can be furnished to host devices, e.g., during device discovery. Storage device 1328 can also store peripheral device state information and any other data that may be used during operation of peripheral device 1300. Storage device 1328 can also store program code executable to communicate with a transceiver 120, as shown in FIG. 1, e.g., as described above.

Processing subsystem 1330 can include, e.g., one or more single-core or multi-core microprocessors and/or microcontrollers executing program code to perform various functions associated with peripheral device 1300. For example, processing subsystem 1330 can implement various processes (or portions thereof) described above as being implemented by a peripheral device, e.g., by executing program code stored in storage device 1328. Processing subsystem 1330 can also execute other programs to control other functions of peripheral device 1300. In some instances programs executed by processing subsystem 1330 can interact with a host computing device (e.g., host computing device 110 in FIG. 1), e.g., by generating messages to be sent to the host and/or receiving messages from the host. In some instances, the messages can be sent and/or received using a transceiver 120, as shown in FIG. 1, as described above.

User interface 1332 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular peripheral device 1300, a user can operate input devices of user interface 1332 to invoke functionality of peripheral device 1300 and can view and/or hear output from peripheral device 1300 via output devices of user interface 1332. Some accessories may provide a minimal or no user interface. Where the peripheral device does not have a user interface, a user can still interact with the peripheral device using a host (e.g., host 1400).

Peripheral device-specific hardware 1334 can include any other components that may be present in peripheral device 1300 to enable its functionality. For example, in various embodiments peripheral device-specific hardware 1334 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of peripheral device functionality can be supported by providing appropriate peripheral device-specific hardware 1334 and that peripheral device-specific hardware can include mechanical as well as electrical or electronic components.

Communication interface 1336 can provide voice and/or data communication capability for peripheral device 1300. In some embodiments communication interface 1336 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1336 can provide wired network connectivity (e.g., Ethernet) in addition to or instead of a wireless interface. Communication interface 1336 can be implemented using a combination of hardware (e.g., driver circuits, antennas, modulators/demodulators, encoders/decoders, and other analog and/or digital signal processing circuits) and software components. In some embodiments, communication interface 1336 can support multiple communication channels concurrently or at different times, using the same transport or different transports. Thus, for example, peripheral device 1300 can communicate with a host via a local channel at some times and via a relay service at other times.

Secure storage module 1338 can be an integrated circuit or the like that can securely store cryptographic information for peripheral device 1300. Examples of information that can be stored within secure storage module 1338 include the peripheral device's long-term public and secret keys 1342 (LTPKA, LTSKA), a list of local pairings 1344 (e.g., a lookup table that maps a local host identifier to a host long-term public key (LTPKC) for hosts that have completed a local pair setup or pair add process, e.g., as described above, with peripheral device 1300), and a list of relay pairings 1346 (e.g., host RAs and associated access tokens for hosts that have established a relay pairing, e.g., as described above, with peripheral device 1300). In some embodiments, pairing information can be stored such that a local pairing 1344 is mapped to the corresponding relay pairing 1346 in instances where both a local pairing and a relay pairing with the host have been established. In some embodiments, secure storage module 1338 can be omitted; keys and lists of paired hosts can be stored in storage device 1328.

In some embodiments, cryptographic operations can be implemented in a cryptographic logic module 1340 that communicates with secure storage module 1338. Physically, cryptographic logic module 1340 can be implemented in the same integrated circuit with secure storage module 1338 or a different integrated circuit (e.g., a processor in processing subsystem 1330) as desired. Cryptographic logic module 1340 can include various logic circuits (fixed or programmable as desired) that implement or support cryptographic operations of peripheral device 1300, including any or all cryptographic operations described above. Secure storage module 1338 and/or cryptographic logic module 1340 can appear as a "black box" to the rest of peripheral device 1300. Thus, for instance, communication interface 1336 can receive a message in encrypted form that it cannot decrypt and can simply deliver the message to processing subsystem 1330. Processing subsystem 1330 may also be unable to decrypt the message, but it can recognize the message as encrypted and deliver it to cryptographic logic module 1340. Cryptographic logic module 1340 can decrypt the message (e.g., using information extracted from secure storage module 1338) and determine what information to return to processing subsystem 1330. As a result, certain information can be available only within secure storage module 1338 and cryptographic logic module 1340. If secure storage module 1338 and cryptographic logic module 1340 are implemented on a single integrated circuit that executes code only from an internal secure repository, this can make extraction of the information extremely difficult, which can provide a high degree of security. Other implementations are also possible.

Peripheral device 1300 can be any electronic apparatus that interacts with host 1400. In some embodiments, host 1200 can provide remote control over operations of peripheral device 1300 as described above. For example host 1400 can provide a remote user interface for peripheral device 1300 that can include both input and output controls (e.g., a display screen to display current status information obtained from peripheral device 1300 and an input control such as a touchscreen overlay to allow changes to the status information). Host 1400 in various embodiments can control any function of peripheral device 1300 and can also receive data from peripheral device 1300, via a transceiver 120, as shown in FIG. 1.

Figure 14:
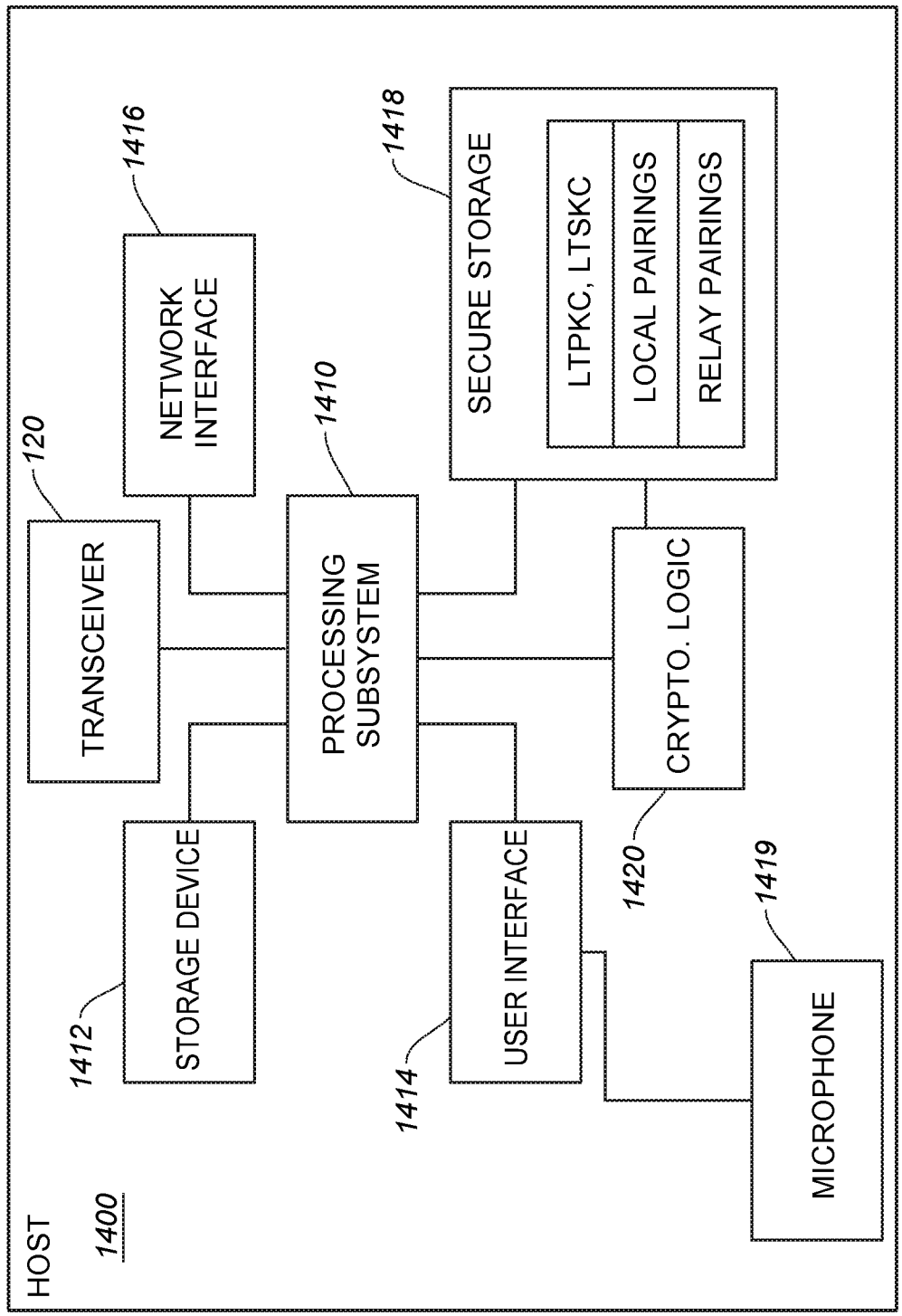
FIG. 14 shows a simplified block diagram of an example host computing device, according to certain embodiments.

FIG. 14 shows a simplified block diagram of an example host computing device 1400, according to certain embodiments. In some embodiments, host 1400 can implement any or all of the functions, behaviors, and capabilities described herein as being performed by a host, as well as other functions, behaviors, and capabilities not expressly described. Host 1400 can include processing subsystem 1410, storage device 1414, user interface 1414, communication interface 1416, secure storage module 1418, and cryptographic logic module 1420. Host 1400 can also include other components (not explicitly shown) such as a battery, power controllers, and other components operable to provide various enhanced capabilities. In various embodiments, host 1400 can be implemented in a desktop computer, laptop computer, tablet computer, smart phone, other mobile phone, wearable computing device, or other systems having any desired form factor. Further, as noted above, host 1400 can be implemented partly in a base station and partly in a mobile unit that communicates with the base station and provides a user interface.

Storage device 1412 can be implemented, e.g., using disk, flash memory, or any other non-transitory storage medium, or a combination of media, and can include volatile and/or non-volatile media. In some embodiments, storage device 1412 can store one or more application and/or operating system programs to be executed by processing subsystem 1410, including programs to implement various operations described above as being performed by a host. For example, storage device 1412 can store a uniform host application that can read a peripheral device description record and generate a graphical user interface for controlling the peripheral device based on information therein. Storage device 1412 can also store program code executable to communicate with a transceiver 120, as shown in FIG. 1, e.g., as described above. Although FIG. 9 illustrates transceiver 120 as a subsystem of host 1400 it is understood that transceiver 120 may be a dongle that is plugged into and electrically coupled with host 1400. In some embodiments, portions (or all) of the host functionality described herein can be implemented in operating system programs rather than applications. In some embodiments, storage device 1412 can also store apps designed for specific accessories or specific categories of accessories (e.g., an IP camera app to manage an IP camera peripheral device or a security app to interact with door lock accessories).

User interface 1414 can include input devices such as a touch pad, touch screen, scroll wheel, click wheel, dial, button, switch, keypad, microphone 1419, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1414 to invoke the functionality of host 1400 and can view and/or hear output from host 1400 via output devices of user interface 1414.

Processing subsystem 1410 can be implemented as one or more integrated circuits, e.g., one or more single-core or multi-core microprocessors or microcontrollers, examples of which are known in the art. In operation, processing system 1410 can control the operation of host 1400. In various embodiments, processing subsystem 1410 can execute a variety of programs in response to program code and can maintain multiple concurrently executing programs or processes. At any given time, some or all of the program code to be executed can be resident in processing subsystem 1410 and/or in storage media such as storage device 1412.

Through suitable programming, processing subsystem 1410 can provide various functionality for host 1400. For example, in some embodiments, processing subsystem 1410 can implement various processes (or portions thereof) described above as being implemented by a host. Processing subsystem 1410 can also execute other programs to control other functions of host 1400, including application programs that may be stored in storage device 1412. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a transceiver 120, as shown in FIG. 1, as described above.

Communication interface 1416 can provide voice and/or data communication capability for host 1400. In some embodiments communication interface 1416 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1416 can provide wired network connectivity (e.g., Ethernet) in addition to or instead of a wireless interface. Communication interface 1416 can be implemented using a combination of hardware (e.g., driver circuits, antennas, modulators/demodulators, encoders/decoders, and other analog and/or digital signal processing circuits) and software components. In some embodiments, communication interface 1416 can support multiple communication channels concurrently or at different times, using the same transport or different transports. Thus, for example, host 1400 can communicate with accessories via a local channel at some times and via a relay service at other times.

Secure storage module 1418 can be an integrated circuit or the like that can securely store cryptographic information for host 1400. Examples of information that can be stored within secure storage module 1418 include the host's long-term public and secret keys 1422 (LTPKC, LTSKC), a list of local pairings 1424 (e.g., a lookup table that maps a local peripheral device identifier to a peripheral device long-term public key (LTPKA) for accessories that have completed a local pair setup or pair add process, e.g., as described above, with host 1400), and a list of relay pairings 1426 (e.g., peripheral device RAs and associated access tokens for accessories that have established a relay pairing, e.g., as described above, with host 1400). In some embodiments, pairing information can be stored such that a local pairing 1424 is mapped to the corresponding relay pairing 1426 in instances where both a local pairing and a relay pairing with the peripheral device have been established.

In some embodiments, cryptographic operations can be implemented in a cryptographic logic module 1420 that communicates with secure storage module 1418. Physically, cryptographic logic module 1420 can be implemented in the same integrated circuit with secure storage module 1418 or a different integrated circuit (e.g., a processor in processing subsystem 1410) as desired. Cryptographic logic module 1420 can include various logic circuits (fixed or programmable as desired) that implement or support cryptographic operations of host 1400, including any or all cryptographic operations described above. Secure storage module 1418 and/or cryptographic logic module 1420 can appear as a "black box" to the rest of host 1400. Thus, for instance, communication interface 1416 can receive a message in encrypted form that it cannot decrypt and can simply deliver the message to processing subsystem 1410. Processing subsystem 1410 may also be unable to decrypt the message, but it can recognize the message as encrypted and deliver it to cryptographic logic module 1420. Cryptographic logic module 1420 can decrypt the message (e.g., using information extracted from secure storage module 1418) and determine what information to return to processing subsystem 1410. As a result, certain information can be available only within secure storage module 1418 and cryptographic logic module 1420. If secure storage module 1418 and cryptographic logic module 1420 are implemented on a single integrated circuit that executes code only from an internal secure repository, this can make extraction of the information extremely difficult, which can provide a high degree of security. Other implementations are also possible.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 1400 can perform all operations described above as being performed by a media access device and that an implementation of peripheral device 1300 can perform any or all operations described above as being performed by a peripheral device. A proxy, bridge, tunnel, or coordinator can combine components of host 1400 and peripheral device 1300, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Most embodiments may incorporate at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A transceiver configured to wirelessly transfer data between a host computing device and a plurality of computer peripheral devices over a communication path using a communication data construct sent by the transceiver comprising:
    a plurality of packet structures forming a communication protocol configured for transferring peripheral device data between the host device and the plurality of computer peripheral devices,
    wherein each of the packet structures of the plurality of packet structures includes:
        a single destination address configured to:
            identify which of the plurality of computer peripheral devices will receive the peripheral device data from the host computing device in the present packet structure; and
            identify which of the plurality of computer peripheral devices will not receive the peripheral device data from the host computing device in a present packet structure,
            wherein the single destination address causes the corresponding packet structure to reach each of the plurality of computer peripheral devices; and
        a data field configured to contain peripheral operational data for each of the plurality of computer peripheral devices in each of the plurality of packet structures,
            wherein the peripheral operational data is different for each of the plurality of computer peripheral devices.

2. The transceiver of claim 1 wherein the peripheral device data includes at least one of human interface device (HID) data, audio data, or image data.

3. The transceiver of claim 1 further configured to receive the peripheral device data from each of the plurality of computer peripheral devices, wherein the peripheral device data from each of the plurality of computer peripheral devices includes:
  an address uniquely identifying the particular computer peripheral device; and
  data corresponding to usage of the particular computer peripheral device.

4. The transceiver of claim 1 wherein each of the packet structures includes control data configured to cause the each of the plurality of computer peripheral devices to send their corresponding data during a time period that is offset from the data received from the other computer peripheral devices in a time-division-multiplexed (TDM) schema.

5. The transceiver of claim 4 wherein the control data is further configured to cause all of the peripheral device data received from each of the plurality of peripheral devices to be sent within a receive window not to exceed a predetermined duration.

6. The transceiver of claim 5 wherein the transceiver is configured to switch from a transmit mode to a receive mode after sending each of the packet structures.

7. The transceiver of claim 6 wherein a combined duration of each packet structure, a corresponding switch from the transmit mode to the receive mode, and a corresponding receive window for said each packet structure is less than or equal to 1 ms.

8. The transceiver of claim 1 wherein the single destination address designates:
  each of the plurality of computer peripheral devices to receive the operational data in the present packet; and
  each of the plurality of computer peripheral devices not to receive the operational data in the present packet.

9. The transceiver of claim 8 wherein each packet structure further contains data causing each of the plurality of computer peripheral devices designated to receive operational data in the present packet to power down after receiving the corresponding operational data from the present packet structure.

10. The transceiver of claim 8 wherein each packet structure further contains data causing each of the plurality of computer peripheral devices not designated to receive operational data in the present packet to power down or stop receiving data from the present packet structure.

11. The transceiver of claim 1 wherein each of the packet structures includes at least one check value configured to cause each of the peripheral devices to use the check value to verify data integrity of data within the packet structure.

12. A method for wirelessly transferring data between a host computing device and a plurality of computer peripheral devices over a communication path, the method comprising:
  generating a packet structure that includes:
    a single destination address configured to:
      identify which of the plurality of computer peripheral devices will receive peripheral device data from the host computing device in the present packet structure; and
      which of the plurality of computer peripheral devices will not receive the peripheral device data from the host computing device in a present packet structure,
    wherein the single destination address causes the corresponding packet structure to reach each of the plurality of computer peripheral devices; and
    a data field configured to contain peripheral operational data for each of the plurality of computer peripheral devices,
      wherein the peripheral operational data is different for each of the plurality of computer peripheral devices; and
  wirelessly transmitting the packet structure from a transceiver coupled to the host computing device to the plurality of computer peripheral devices.

13. The transceiver of claim 12 wherein the peripheral device data includes at least one of human interface device (HID) data, audio data, or image data.

14. The method of claim 12 wherein the packet structure includes control data configured to cause the each of the plurality of computer peripheral devices to send their corresponding peripheral device data during a time period that is offset from the peripheral device data received from the other computer peripheral devices in a time-division-multiplexed (TDM) schema.

15. The method of claim 14 wherein the control data is further configured to cause all of the data received from each of the plurality of peripheral devices to be sent within a receive window not to exceed a predetermined duration.

16. The method of claim 15 further comprising:
  causing a transceiver coupled to the host computing device to switch from a transmit mode to a receive mode after sending the packet structure.

17. The method of claim 16 wherein a duration of the packet structure, a corresponding switch from the transmit mode to the receive mode, and a corresponding receive window for the packet structure is less than or equal to 1 ms.

18. The method of claim 12 wherein the single destination address designates:
  each of the plurality of computer peripheral devices to receive the operational data in the present packet; and
  each of the plurality of computer peripheral devices not to receive the operational data in the present packet.

19. The method of claim 18 wherein the packet structure further contains data causing each of the plurality of computer peripheral devices designated to receive operational data in the present packet to power down after receiving the corresponding operational data from the present packet structure.

20. The method of claim 18 wherein the packet structure further contains data causing each of the plurality of computer peripheral devices not designated to receive operational data in the present packet to power down or stop receiving data from the present packet structure.

* * * * *